United States Patent
Yu et al.

(10) Patent No.: US 8,868,993 B1
(45) Date of Patent: Oct. 21, 2014

(54) DATA REPLACEMENT POLICY

(75) Inventors: Kevin Yu, Palo Alto, CA (US); Xinyi Zhang, San Jose, CA (US)

(73) Assignee: Google Inc., Mountain View, CA (US)

( * ) Notice: Subject to any disclaimer, the term of this patent is extended or adjusted under 35 U.S.C. 154(b) by 191 days.

(21) Appl. No.: 13/446,945

(22) Filed: Apr. 13, 2012

(51) Int. Cl.
*G06F 11/00* (2006.01)
*H04L 1/00* (2006.01)

(52) U.S. Cl.
USPC .......................................................... 714/747

(58) Field of Classification Search
CPC ......... H04B 3/23; H04J 3/22; H04L 12/2801; H04L 12/6418; H04L 12/66; H04L 27/0012; H04L 29/06; H04L 29/06027; H04L 47/10; H04L 47/11; H04L 47/263; H04L 47/28; H04L 65/80; H04L 65/1043; H04L 65/01; H04M 3/002; H04M 3/22; H04M 7/0069; H04M 7/0072
See application file for complete search history.

(56) References Cited

U.S. PATENT DOCUMENTS

| | | | |
|---|---|---|---|
| 7,085,268 B2 * | 8/2006 | Fukuda et al. ................. 370/389 |
| 7,773,741 B1 * | 8/2010 | LeBlanc et al. ........... 379/406.01 |
| 8,254,404 B2 * | 8/2012 | Rabenko et al. ............... 370/429 |
| 8,515,054 B2 * | 8/2013 | LeBlanc et al. .......... 379/406.08 |
| 2002/0157058 A1 * | 10/2002 | Ariel et al. ..................... 714/774 |
| 2003/0067872 A1 * | 4/2003 | Harrell et al. .................. 370/229 |
| 2004/0252700 A1 * | 12/2004 | Anandakumar et al. . 370/395.21 |
| 2006/0133358 A1 * | 6/2006 | Li et al. .......................... 370/352 |
| 2007/0110042 A1 * | 5/2007 | Li et al. .......................... 370/352 |
| 2008/0192119 A1 * | 8/2008 | Li et al. .......................... 348/180 |
| 2011/0051924 A1 * | 3/2011 | LeBlanc et al. .......... 379/406.06 |
| 2011/0208517 A1 * | 8/2011 | Zopf .............................. 704/211 |

* cited by examiner

*Primary Examiner* — Guerrier Merant
(74) *Attorney, Agent, or Firm* — John D. Lanza; Foley & Lardner LLP

(57) ABSTRACT

Systems and methods are provided for estimating missing samples in a signal. A plurality of samples in the signal is received, and a respective sample corresponds to a respective sample location in a plurality of sample locations. A subset of sample locations representing missing samples in the signal is identified, and a first and a second threshold are determined. Each threshold is an integer number of samples, and the second threshold is greater than the first threshold. A first set of consecutive sample locations from the identified subset of sample locations is formed, and the missing samples in the first set of consecutive sample locations are replaced based on a comparison between a number of locations in the first set of consecutive locations, the first threshold, and the second thresholds.

18 Claims, 5 Drawing Sheets

DATA REPLACEMENT POLICY

FIELD OF THE INVENTION

In general, the systems and methods described herein relate to data analysis, and particularly, to identifying and replacing missing data samples in a discrete signal.

BACKGROUND

Missing data is common in a large number of applications, such as in network traffic data, in medical data, and in economic data, to name a few. Data may be missing for any number of reasons. In one example, devices configured to record data may be non-operational during power-related emergencies or these devices may be powered down during scheduled maintenance, resulting in missing data that would otherwise be recorded. In addition, data may be recorded but then lost for any number of reasons, such as dropped data packets when network congestion levels are high. Furthermore, recorded data may be inaccurate, such that the some of the data that is recorded may not reveal much information regarding the true value.

Often, it is desirable to replace the missing (or inaccurate) data in a signal with predictive model estimates. Various algorithms using the non-missing data are often used to derive estimates of the missing data and vary in complexity. For example, interpolation methods range from simple linear interpolation processes to $n^{th}$ degree polynomial interpolation. Data replacement algorithms may also use model estimates based on some knowledge of the signal to replace missing data. It is desirable to use a suitable process to replace missing data in a signal, but different processes may be suitable under different circumstances.

Systems and methods to replace missing data in a signal would therefore be of great benefit in data analysis.

SUMMARY

Accordingly, the systems and methods described herein include, among other things, providing a data replacement policy for missing samples in a signal. The method comprises receiving a plurality of discrete samples in the signal, where a respective sample has a respective sample location in a plurality of sample locations. A subset of sample locations representing missing samples in the signal is identified, and a first and a second threshold are determined. Each threshold is an integer number of samples, and the second threshold is greater than the first threshold. A first set of consecutive sample locations from the identified subset of sample locations is formed, and the missing samples in the first set of consecutive sample locations are replaced based at least in part on a comparison between a number of locations in the first set of consecutive locations, the first threshold, and the second thresholds.

In one embodiment, the samples in the signal correspond to a number of data packets arriving at a location in a network within a time interval.

In one embodiment, the selected replacement process comprises signal interpolation if the number of locations is less than the first threshold.

In one embodiment, the selected replacement process comprises signal modeling if the number of locations is between the first and second thresholds. In one embodiment, signal modeling comprises identifying a trend component of the signal based on a plurality of received samples. In one embodiment, signal modeling comprises identifying a cyclical component of the signal based on a plurality of received samples. The method optionally further comprises determining a period of the cyclical component of the signal. The first threshold is determined to be at least an order of magnitude less than the determined period, the second threshold is determined to be on a same order as the determined period.

In one embodiment, the method further comprises receiving a plurality of quality values. In particular, each quality value in the plurality of quality values is an amount of accuracy of a corresponding discrete sample. Optionally, the subset of sample locations representing missing samples in the signal is identified by identifying discrete samples with corresponding quality values below a quality threshold. In addition, in an embodiment, the replacement process is based at least in part on a plurality of quality values corresponding to a plurality of identified non-missing samples.

According to another aspect, the systems and methods described herein relate to a apparatus to carry out the methods described above. In particular, a computer apparatus is described for replacing missing samples in a signal comprising a plurality of discrete samples. The apparatus comprises a memory containing instructions that, when executed by one or more processors, cause the one or more processors to perform a set of steps. The set of steps comprises receiving a plurality of the discrete samples, a respective discrete sample having a respective sample location in a plurality of sample locations, identifying a subset of sample locations representing missing samples in the signal, and determining a first threshold and a second threshold. The first and second thresholds are each an integer number of samples, and the second threshold is greater than the first threshold. The set of steps further comprises forming a first set of consecutive sample locations from the identified subset of sample locations and replacing the missing samples in the first set of consecutive sample locations using a replacement process selected based at least in part on a comparison between a number of locations in the first set of consecutive locations, the first threshold, and the second threshold.

In one embodiment, the samples in the signal correspond to a number of data packets arriving at a location in a network within a time interval.

In one embodiment, the selected replacement process comprises signal interpolation if the number of locations is less than the first threshold.

In one embodiment, the selected replacement process comprises signal modeling if the number of locations is between the first and second thresholds. In one embodiment, signal modeling comprises identifying a trend component of the signal based on a plurality of received samples. In one embodiment, signal modeling comprises identifying a cyclical component of the signal based on a plurality of received samples. The set of steps optionally further comprises determining a period of the cyclical component of the signal. The first threshold is determined to be at least an order of magnitude less than the determined period, the second threshold is determined to be on a same order as the determined period.

In one embodiment, the set of steps further comprises receiving a plurality of quality values. In particular, each quality value in the plurality of quality values is an amount of accuracy of a corresponding discrete sample. Optionally, the subset of sample locations representing missing samples in the signal is identified by identifying discrete samples with corresponding quality values below a quality threshold. In addition, in an embodiment, the replacement process is based at least in part on a plurality of quality values corresponding to a plurality of identified non-missing samples.

BRIEF DESCRIPTION

The above and other features of the present disclosure, including its nature and its various advantages, will be more apparent upon consideration of the following detailed description, taken in conjunction with the accompanying drawings in which.

DETAILED DESCRIPTION

To provide an overall understanding of the invention, certain illustrative embodiments will now be described, including a system for replacing missing data in a signal. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
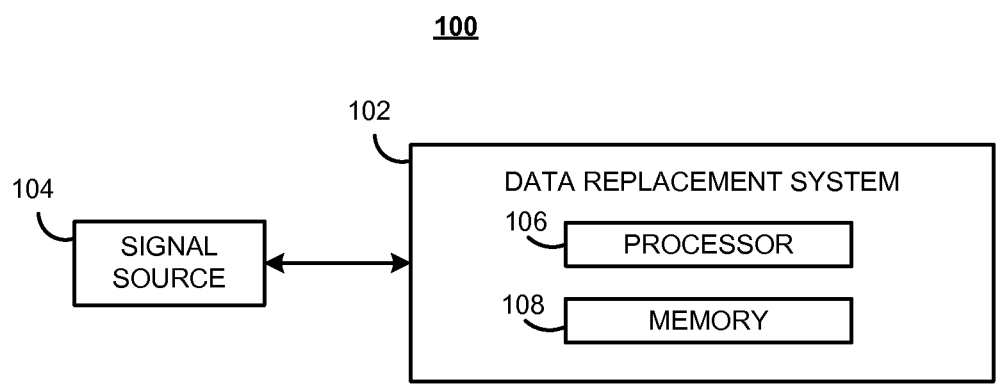
FIG. 1 is a block diagram of a system for replacing missing samples in a signal.

FIG. 1 illustrates one embodiment of a system 100 for replacing missing data in a signal. The system 100 includes a signal source 104 and a data replacement system 102 including a processor 106 and a memory unit 108.

The signal source 104 provides a signal to the data replacement system 102, and can be any source of a signal. The signal may be a discretized version of a continuous signal. As an example, the signal source 104 may include a device that monitors an amount of traffic flow in a network, and the signal may be a vector of discrete samples corresponding to an amount of traffic flow in the network as a function of time. In an example, the signal may correspond to a number of data packets arriving at a particular node in the network in a given time window. The signal source 104 may further be configured to process the signal to get the signal into a desired form, such as by controlling the amplitude of the signal or adjusting other characteristics of the signal. For example, the signal source 104 may quantize the signal, filter the signal, or perform any number of processing techniques on the signal. In general, any signal source may be used, if it is desirable to replace missing samples in the provided signal.

The data replacement system 102 is a device that replaces missing samples in a signal provided by the signal source 104. In particular, the data replacement system 102 identifies locations of missing samples in the signal. After forming sets of consecutive locations based on the identified locations, the data replacement system 102 replaces sets of missing samples with values using a process selected based on a number of missing samples in each set.

For example, the number of missing samples in each set may be categorized as small, medium, or large. The categorization may be dependent on a comparison between the number of missing samples in a set and two different threshold values. For example, the number may be categorized as small if the number is below the lower threshold, large if above the higher threshold, and medium if in between the two thresholds. If the number of consecutive missing samples in a set is small, an interpolation process may be used to replace the missing samples in the set. Interpolation processes may be appropriate for a small number of missing samples because the likelihood that the missing samples included a large deviation from the surrounding non-missing samples is small. In contrast, for a large number of consecutive missing samples, a system is much less likely to recover these samples with high fidelity. Thus, a set of a large number of missing samples may not be replaced at all by the data replacement system 102. In this case, the data replacement system 102 may identify these missing samples as unrecoverable. Alternatively, if the number of missing samples in the set is categorized as medium, the data replacement system 102 may, as described below, use a different process that uses known information about the signal.

The data replacement system 102 includes a processor 106 and a memory unit 108. As used herein, the term "processor" or "computing device" refers to one or more computers, microprocessors, logic devices, servers, or other devices configured with hardware, firmware, and software to carry out one or more of the processes described herein. An illustrative computing device 400, which may be used to implement any of the processors described herein, is described in detail below with reference to FIG. 4. The memory unit 108 is configured to store input data, output data, and data currently being processed by the processor 106.

Any suitable variation of system 100 may be used to replace missing samples in a signal. For example, additional processors or memory units may be used to process or store data. In addition, the processor 106 may include a memory unit to store any or all of the data used during processing. In another example, the data replacement system 102 may be included within the same device as the signal source 104. However, for ease of discussion, the remainder of this disclosure will describe replacing missing data in a signal with reference to the system 100 of FIG. 1.

Figure 2:
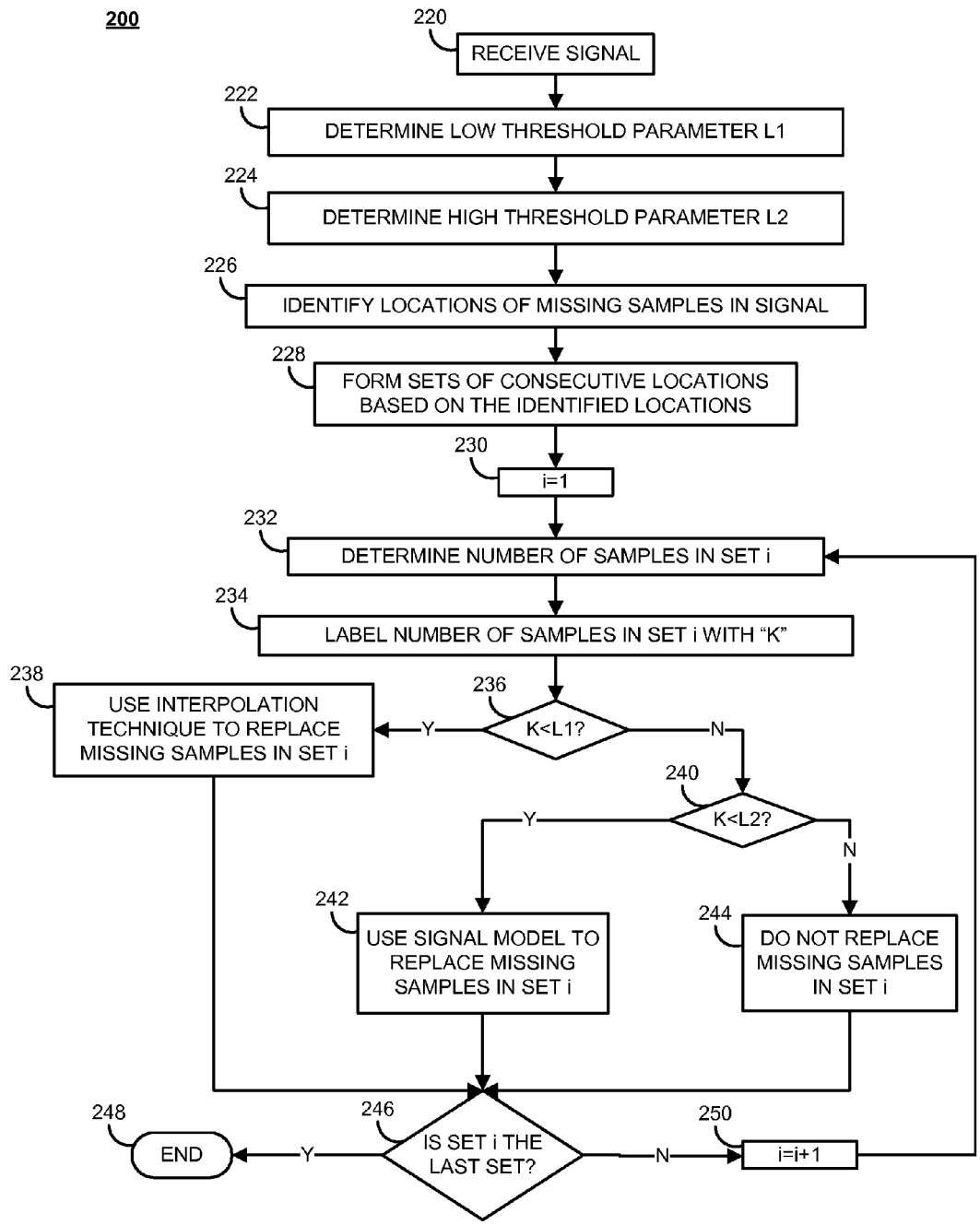
FIG. 2 is a flow chart of a method for replacing missing samples in a signal.

FIG. 2 is a flow chart of one illustrative method 200 used by the processor 106 for replacing missing data in a signal. The method 200 may be used to determine an appropriate process for replacing a number of consecutive missing samples in the signal. In particular, the number of consecutive missing samples in a group may be categorized as small, medium, or large based on a comparison between the number and two different threshold values, as described in relation to FIG. 1. For a group of a small number of consecutive missing samples, a simple interpolation process may be used to replace the group. Otherwise, if a number of missing samples in a group is categorized as medium, a more sophisticated process may be employed such as using a signal modeling process. For a group with a large number of consecutive missing samples, the processor 106 may determine that the group of missing samples should not be replaced.

The depicted method 200 begins with the steps of receiving a signal (step 220), determining a low threshold parameter L1, (step 222), determining a high threshold parameter L2 (step 224), identifying locations of missing samples in the signal (step 226), and forming sets of consecutive locations based on the identified locations (step 228). After initializing an iteration parameter i to one (step 230), the processor 106 determines a number of samples in the $i^{th}$ set (step 232), labels the determined number with K (step 234), and performs a comparison between K and L1 (decision block 236). If L1 exceeds K, the processor 106 uses an interpolation process to replace the missing samples in the $i^{th}$ set (step 238). Otherwise, the processor 106 performs a comparison between K and L2 (decision block 240). If L2 exceeds K, the processor 106 uses a signal model to replace the missing samples in the $i^{th}$ set (step 242). Otherwise, the missing samples in the $i^{th}$ set are not replaced (step 244). If the $i^{th}$ set is not the last set (decision block 246), i is incremented (step 250), and steps 232-246 are repeated until the method 200 ends when the last set has been processed (step 248).

First, at step 220, the processor 106 receives a signal from the signal source 104. As described in relation to FIG. 1, the signal may be representative of an amount of traffic flow in a network, such as a number of data packets that arrive at a location within a particular time window.

At step 222, the processor 106 determines a low threshold parameter L1. The parameter L1 corresponds to an integer number of samples in the signal. If a number of missing samples is below L1, the data replacement system 102 may categorize the number of missing samples in a set as small. For a small set of missing samples, the processor 106 may use one process to replace the missing samples, and may use a different process when a number of missing samples exceeds L1. The processor 106 may select L1 in a number of ways. In an example, a user provides input to the data replacement system 102, and the processor 106 selects L1 based on the user input. In this case, the user input may be precisely L1, or the processor 106 may process the user input to derive an appropriate value for L1. For example, when the signal corresponds to a time series, the user input may include a time interval corresponding to a desired threshold between small and medium categories. For example, the user input may be a second, a minute, a day, a month, or any other suitable time interval. In this case, the processor 106 may determine L1 by multiplying the time interval by the signal's sampling frequency (and optionally rounding if necessary) to arrive at a value for L1. In general, it may be desirable to use different values of L1 for different types of signals or for different types of replacement processes.

In an example, the data replacement system 102 may be used in a system for detecting anomalies in a signal. In this case, a minimum number of samples in an anomaly may be defined to be one, and L1 may be selected to be related to this minimum number of samples in an anomaly. For example, L1 may be selected to be twice the minimum number of samples in an anomaly, resulting in an L1 value of two samples.

At step 224, the processor 106 determines a high threshold parameter L2. The parameter L2 corresponds to an integer number of samples in the signal and is larger than L1. Similar to L1, L2 corresponds to a threshold value, in which if a number of missing samples is below L2, the processor may use a different process to replace the missing samples than when a number of missing samples exceeds L2. The processor 106 may select L2 in a number of ways as described for L1, and may use a similar process to select L2 as L1, or a different process.

In an example, the signal corresponds to a number of data packets over time, representing an amount of traffic flow in a network. In this case, the sampling period of the signal may correspond to a minute, L1 may be on the order of one day or less, and L2 may be on the order of a week.

In an example, the data replacement system 102 may be used in a system for detecting anomalies in a signal. In this case, a cyclic component may be identified in the signal. Before identifying the cyclic component, the signal may first be detrended, such that long-term fluctuations in the original signal are removed. A cyclic component may then be identified in the detrended signal by identifying a period of interest, segmenting the detrended signal based on the identified period, and superimposing the resulting segments to build a cyclic pattern. The process of identifying a trend and a cyclic component is described in further detail in relation to FIG. 3. Based on the period of the cyclic pattern, a value for L2 may be selected. For example, the value for L2 may be selected to be on the order of the period, ranging from half the period to twice the period.

At step 226, the processor 106 identifies locations of missing samples in the signal. In particular, each sample in the signal has a corresponding sample location. Missing samples may be identified by sample locations without corresponding samples, or with sample values corresponding to nonsense values, such as Not a Number (NaN) or similar values. As an example, when the signal represents an amount of data traffic in a network recorded at a server, sometimes the amount of data traffic is not recorded when the server is down due to power-related emergencies such as outages or due to scheduled maintenance. During these times, the samples in the signal may have values corresponding to their initialized values (NaN), or the samples may simply be missing. Therefore, locations of missing samples may be identified by simply determining those locations without corresponding samples or with nonsense-valued samples.

Alternatively, locations of missing samples may be identified from additional received information at the data replacement system 102. For example, in addition to receiving the signal from the signal source 104, the data replacement system 102 may also receive a second signal, whose samples represent a quality value corresponding to each sample in the original signal. A sample may be labeled "missing" if the corresponding quality value is below a threshold value Q0 or otherwise meets some criterion. For example, data may be aggregated across multiple sources (which are each subject to outages and/or maintenance), and at any given time, a number of these sources may be non-operational, leading to missing data samples or inaccurate data samples. The number of sources determined to be not operational at any given time may affect the quality value for the samples corresponding to that time. As an example, the quality value of samples recorded when all sources are operational may be higher than when one or more sources are non-operational. Therefore, locations of missing samples may also be identified by using additional information received at the data replacement system 102, and as used herein, these samples may correspond to data believed to be missing or otherwise inaccurate for any reason.

At step 228, the processor 106 forms sets of consecutive locations based on the identified locations. In particular, the formed sets of consecutive locations correspond to consecutive missing samples in the signal, such that each missing sample in a set is adjacent to at least another missing sample in the same set. The sets may be non-overlapping, such that any sample location is not included in more than one set, and at least one non-missing sample in the signal separates any two sets.

At step 230, an iteration parameter i is initialized to one, at step 232, the number of samples in the $i^{th}$ set is determined, and at step 234, the determined number is labeled "K."

At decision block 236, the processor 106 compares L1 and K to determine whether L1 exceeds K. In another example, it may be more desirable to have a more stringent condition such as requiring that L1 exceed K by a threshold amount before determining that L1 sufficiently exceeds K.

When the processor 106 determines that L1 exceeds K or that the $i^{th}$ set of samples satisfies some other criterion, the method 200 proceeds to step 238 and uses an interpolation process to replace the missing samples in the $i^{th}$ set. The interpolation process may include any known interpolation process such as linear interpolation, spline interpolation, Cressman interpolation, Weaver interpolation, trilinear interpolation, or any other suitable method for interpolation. For example, the two non-missing samples closest to the set of missing samples (one immediately preceding the set and one immediately following the set) may be used for the interpolation.

As described above, in some embodiments, in addition to providing a signal, the signal source 104 also provides a quality value indicative of a level of accuracy of the data in the signal. A quality value may be assigned to each sample in the original signal, and a sample may be considered to be missing based on the corresponding quality value, such as if the quality value is below some predetermined threshold Q0. In an example, before replacing a missing sample by using interpolation, the data replacement system 102 may require that the quality value corresponding to the non-missing samples surrounding the set of missing samples exceeds some predetermined threshold Q1. In other words, the data replacement system 102 may require that the non-missing samples used in an interpolation method to replace missing samples are of good quality and are sufficiently accurate. The threshold Q1 is higher than or equal to Q0. As an example, when Q1 equals Q0, this means any sample identified to be non-missing has sufficient quality to be used in interpolation for replacing missing samples.

In an example, any number of non-missing samples may also be used for the interpolation. The processor 106 may perform curve fitting such as linear regression (or any other suitable type of curve fitting) across any number of non-missing samples to replace the set of missing samples. The non-missing samples selected for the curve fitting may not correspond to those closest to the set of missing samples. For example, the threshold for identifying good quality non-missing samples Q1 may exceed the threshold for identifying missing samples Q0, and the closest non-missing samples to the missing set may have quality values between Q0 and Q1. In this case, the processor 106 may use the closest non-missing samples with quality values that exceed Q1 to perform the curve fitting.

Alternatively, if L1 does not exceed K, or otherwise if the criterion required by decision block 236 is not satisfied, the method 200 proceeds to decision block 240 to determine whether L2 exceeds K. Similar to decision block 236, other information may be included in the comparison at the decision block 240. For example, it may be desirable to require that L2 exceeds K by some minimal amount before determining that L2 sufficiently exceeds K.

Figure 3:
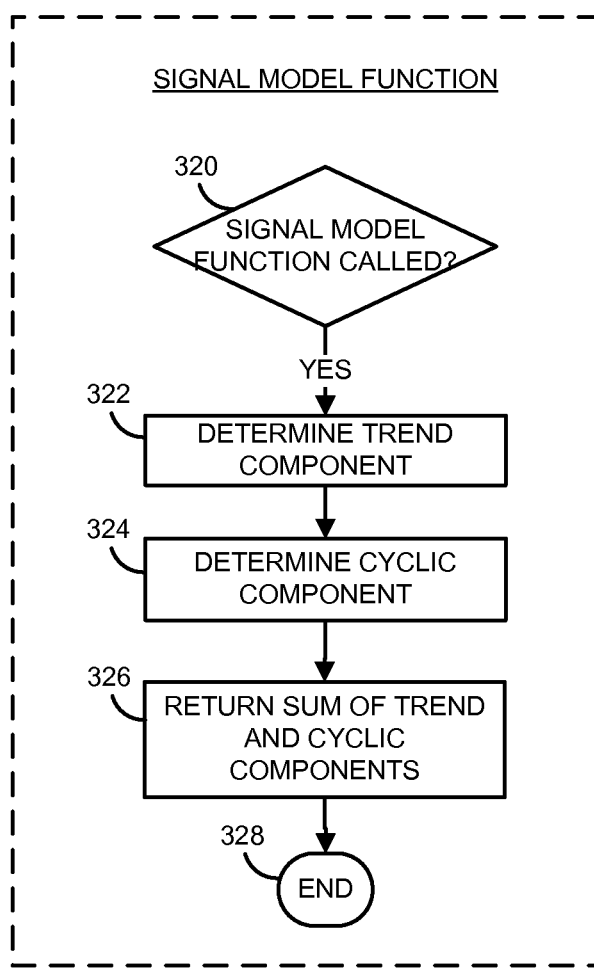
FIG. 3 is a flow chart of a method for using a signal model.

If L2 exceeds K, the method 200 proceeds to step 242 to use a signal model to replace the missing samples in the $i^{th}$ set. The signal model process may occur in a number of ways, and one such example is explained in relation to FIG. 3. In particular, the method illustrated in FIG. 3 depicts using a signal model including a trend component and a cyclic component of the signal, but any suitable method of signal modeling may also be used.

Alternatively, if L2 does not exceed K, the method 200 proceeds to step 244 and does not replace the missing samples in the $i^{th}$ set. In this case, the number of missing samples in the set is determined to be too large to be replaced, and the set of missing samples remain missing. The data replacement system 102 improves upon existing data replacement processes by using different strategies for replacing different sets of missing samples in a signal based on the size of each set.

At decision block 246, the processor 106 determines whether the $i^{th}$ set is the last set, and if not, the iteration parameter i is incremented at step 250 and steps 232-246 are repeated. When the last set has been considered, the method 200 ends at step 248.

In some embodiments, the processor 106 uses the method 200 to replace sets of missing samples in a signal in an "online" mode, meaning that while parsing through the steps of method 200, the data replacement system 102 receives new samples. In this case, the processor 106 may determine the sample locations of a set of missing samples upon receiving the first non-missing sample after the missing samples. Once the set of missing samples is determined, the processor proceeds with steps 232-244 in method 200.

In other embodiments, the processor 106 uses the method 200 in an "offline" mode, meaning that while the data replacement system 102 processes the samples in the received signal, new samples are not received. In other words, all samples of the signal have been received by the data replacement system 102 before processing begins to replace the missing samples.

In some embodiments, a metric may be used to assess the confidence of a replaced sample. This confidence metric may be useful for determining which replaced samples are more certain to be accurate than others. For example, it may be desirable to associate a set with a large number of missing samples with less confidence than a set with a smaller number of missing samples.

In some embodiments, the method 200 is not limited to two threshold values L1 and L2. In general, any number of monotonically increasing threshold values $\{L1, L2, \ldots, LN\}$ may be used, and different processes may be used depending on the relationship between the threshold values and the number of missing samples K. For example, for four threshold values L1, L2, L3, and L4, it may be desirable to use linear interpolation when L1 exceeds K, but cubic spline interpolation when K falls between L1 and L2. In addition, it may be desirable to use the signal model (trend plus cyclic) described in relation to FIG. 3 when K falls between L3 and L4, but only use the trend portion of the signal model when K falls between L2 and L3. In general, any number of threshold values may be used, and any suitable process for replacing the missing samples may be used for any determined relationship between K and the threshold values.

FIG. 3 is a flow chart of one illustrative method 300 for generating a signal model to replace missing samples in a signal. The method 300 may be used by the processor 106 in step 242 of the method 200. The signal model includes identifying a trend component and a cyclic component in a signal. The depicted method 300 begins with determining that the signal model function has been called (decision block 320), and determining a trend component of the signal (step 322) and a cyclic component of the signal (step 324). Then the sum of the trend and cyclic components is returned (step 326), and the method ends (step 328).

At step 320, the processor 106 determines that the signal model function has been called, such as in step 242 of the method 200.

At step 322, the processor 106 determines a trend component of the signal. The trend component may be a linear component or a nonlinear component. In general, a trend component (linear or nonlinear) includes long-term and slow changes, such that the energy in a trend component is mostly concentrated near lower frequencies than the cyclic component.

Determination of a linear trend is described in detail in U.S. patent application Ser. No. 13/446,842, which is incorporated herein in entirety by reference. Determining a linear trend component of a signal may first include detecting trend change points in a signal, corresponding to points in a signal where the underlying distribution changes. Bayesian methods and maximum likelihood processes may be used to detect trend change points in the signal. For example, a number of consecutive samples of the signal may be appended to a buffer, and Bayesian methods are used to determine which, if any, sample in the buffer corresponds to a trend change point.

Determination of a nonlinear trend is described in detail in U.S. patent application Ser. No. 13/483,601, which is incorporated herein in entirety by reference. Determining a nonlinear trend component of a signal may first include decomposing the signal into multiple components. The signal decomposition may be performed in a number of ways, such as using empirical mode decomposition. Components may be determined to be trend or noise components based on a comparison between a frequency in the component and a cut-off frequency.

At step 324, the processor 106 determines a cyclic component of the signal. Determination of a cyclic component of a signal is described in detail in U.S. patent application Ser. No. 13/488,875, which is incorporated herein in entirety by reference. Typically, a cyclic component includes faster fluctuations than a trend component, such that the energy in a cyclic component is mostly concentrated near higher frequencies than the trend component. Determining a cyclic component of a signal may first include removing the determined trend component in step 322 from the original received signal. A period of interest may then be identified, and the signal may be segmented based on the identified period. The resulting segments may then be superimposed, thus building a point-by-point model of the cyclic pattern.

At step 326, the processor 106 returns the sum of the determined trend and cyclic components. As used herein, the signal model refers to the superposition of the trend and cyclic components of the signal. In general, the signal model may further include a residual component modeled as a zero mean stochastic noise process. Determination of a residual component of a signal is described in detail in U.S. patent application Ser. No. 13/480,042, which is incorporated herein in entirety by reference. The residual component is determined by subtracting the trend and cyclic components from the original signal. Typically, the energy in the residual component is mostly concentrated near higher frequencies than the cyclic component. The residual component may be used for anomaly detection, which is described in detail in U.S. patent application Ser. No. 13/480,084 and U.S. patent application Ser. No. 13/480,124, which are both incorporated herein in entirety by reference.

In some embodiments, the signal may not include a trend component, such that only the cyclic component is returned at step 326. Alternatively, the signal may not include a cyclic component, such that only the trend component is returned at step 326.

At step 328, the method 300 ends.

Figure 4:
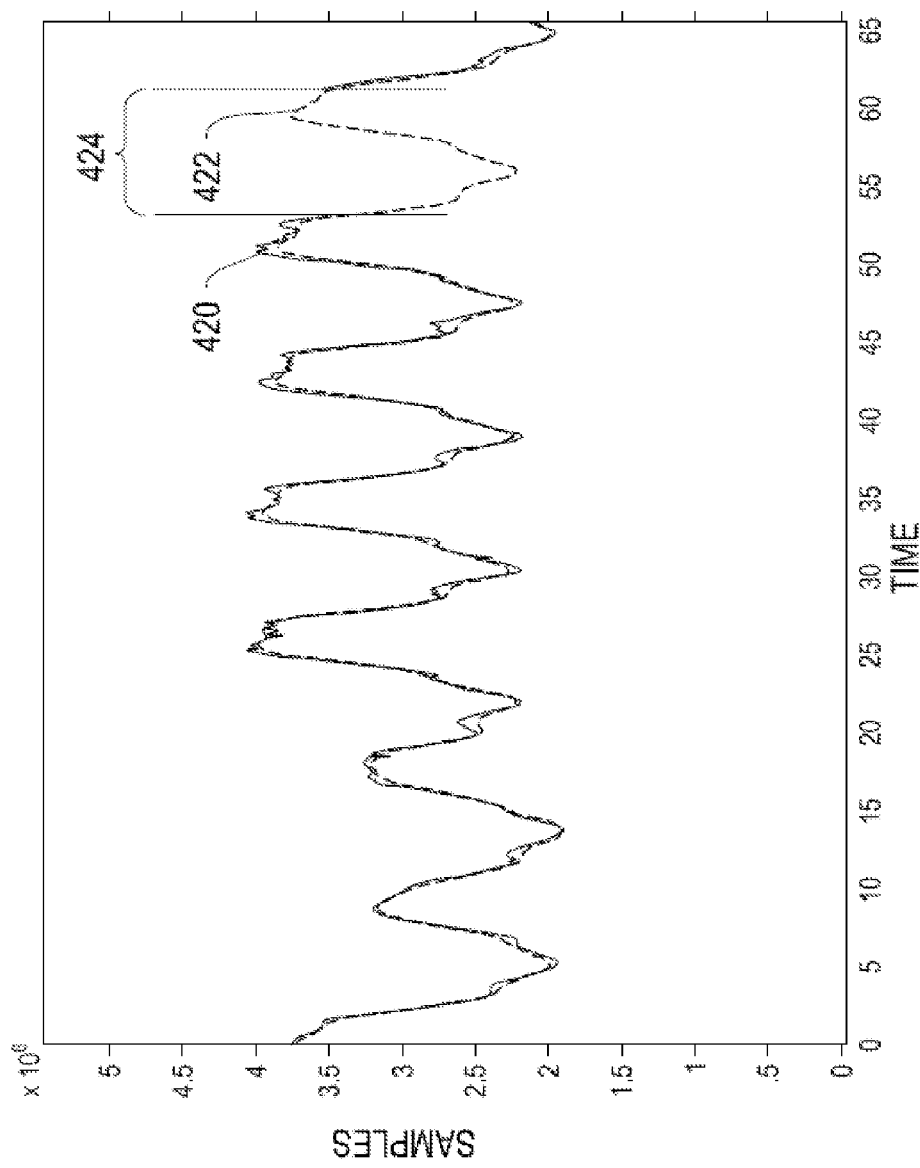
FIG. 4 is a graph of an example signal with a missing segment and the samples used to replace the missing segment.

FIG. 4 is a graph of an example signal 420 provided to the data replacement system 102 from the signal source 104. In particular, signal 420 corresponds to a number of samples (y-axis) as a function of time (x-axis). The y-axis number of samples corresponds to an aggregate bit rate of data packets across multiple locations in a network, but the signal 420 is shown for illustrative purposes only. In general, any signal may be used.

The segment 424 corresponds to a portion of the signal 420 that is missing (roughly corresponding to time values 53 to 62). As described in relation to step 226 of the method 200, segment 424 may be missing from the signal 420 for any reason, and identifying the segment 424 may include identifying a set of consecutive samples of the signal 420 that are missing, have NaN values, have low quality values, or any other suitable method for identifying a segment of a signal that requires replacement.

Upon identifying the missing segment 424, the processor 106 may replace the corresponding samples based on a number of missing samples in the segment 424. In particular, two thresholds may be used compare to the number of missing samples in the segment 424 to identify the size of the segment 424 as small, medium, or large. In this case, the segment 424 is medium-sized, such that the processor 106 replaces the missing segment 424 with a signal model. In particular, the missing segment 424 is replaced with samples from the signal 422, which corresponds to a signal model output, such as the output of the signal model function of FIG. 3. In particular, the signal 422 may correspond to the sum of a trend component and a cyclic component, both determined from non-missing portions of the received signal 420. The use of different replacement strategies for different lengths of missing signal portions, as well as the use of a signal model that includes a trend component and a cyclic component, results in a more realistic data replacement policy than other methods such as simple interpolation.

Figure 5:
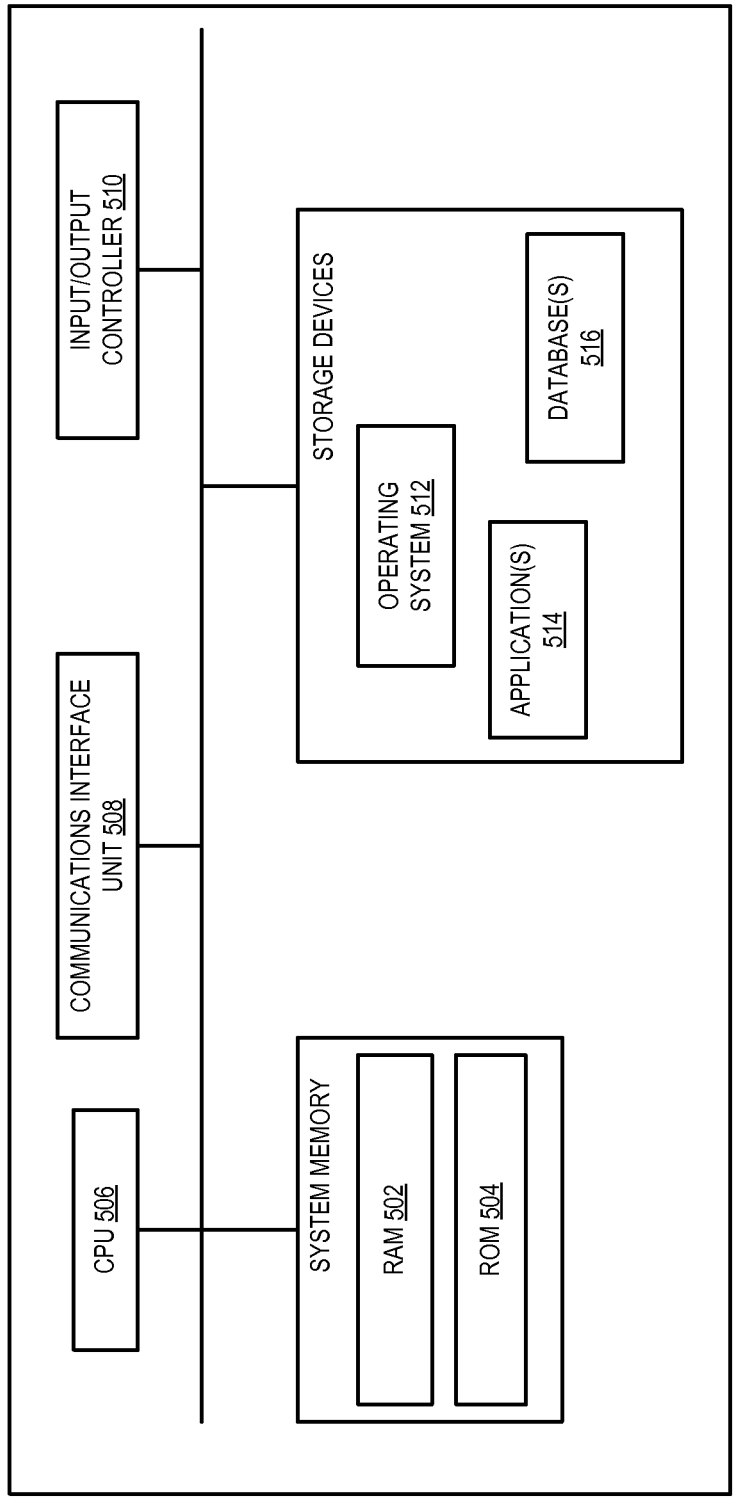
FIG. 5 is a block diagram of a computing device for performing any of the processes described herein.

FIG. 5 is a block diagram of a computing device, such as any of the components of the system of FIG. 1, for performing any of the processes described herein. Each of the components of these systems may be implemented on one or more computing devices 500. In certain aspects, a plurality of the components of these systems may be included within one computing device 500. In certain implementations, a component and a storage device may be implemented across several computing devices 500.

The computing device 500 comprises at least one communications interface unit, an input/output controller 510, system memory, and one or more data storage devices. The system memory includes at least one random access memory (RAM 502) and at least one read-only memory (ROM 504). All of these elements are in communication with a central processing unit (CPU 506) to facilitate the operation of the computing device 500. The computing device 500 may be configured in many different ways. For example, the computing device 500 may be a conventional standalone computer or alternatively, the functions of computing device 500 may be distributed across multiple computer systems and architectures. In FIG. 5, the computing device 500 is linked, via network or local network, to other servers or systems.

The computing device 500 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 508 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 506 comprises a processor, such as one or more conventional microprocessors and one or more supplementary co-processors such as math co-processors for offloading workload from the CPU 506. The CPU 506 is in communication with the communications interface unit 508 and the input/output controller 510, through which the CPU 506 communicates with other devices such as other servers, user terminals, or devices. The communications interface unit 508 and the input/output controller 510 may include multiple communication channels for simultaneous communication with, for example, other processors, servers or client terminals.

The CPU 506 is also in communication with the data storage device. The data storage device may comprise an appropriate combination of magnetic, optical or semiconductor memory, and may include, for example, RAM 502, ROM 504, flash drive, an optical disc such as a compact disc or a hard disk or drive. The CPU 506 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 506 may be connected to the data storage device via the communications interface unit 508. The CPU 506 may be configured to perform one or more particular processing functions.

The data storage device may store, for example, (i) an operating system 512 for the computing device 500; (ii) one or more applications 514 (e.g., computer program code or a computer program product) adapted to direct the CPU 506 in accordance with the systems and methods described here, and particularly in accordance with the processes described in detail with regard to the CPU 506; or (iii) database(s) 516 adapted to store information that may be utilized to store information required by the program.

The operating system 512 and applications 514 may be stored, for example, in a compressed, an uncompiled and an encrypted format, and may include computer program code. The instructions of the program may be read into a main memory of the processor from a computer-readable medium other than the data storage device, such as from the ROM 504 or from the RAM 502. While execution of sequences of instructions in the program causes the CPU 506 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to aligning dietary behavior as described herein. The program also may include program elements such as an operating system 512, a database management system and "device drivers" that allow the processor to interface with computer peripheral devices (e.g., a video display, a keyboard, a computer mouse, etc.) via the input/output controller 510.

The term "computer-readable medium" as used herein refers to any non-transitory medium that provides or participates in providing instructions to the processor of the computing device 500 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 506 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 500 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The invention claimed is:

1. A method for replacing missing samples in a signal comprising a plurality of discrete samples, comprising:
   receiving a plurality of the discrete samples, each discrete sample having a respective sample location in a set of sample locations;
   identifying a subset of sample locations representing missing samples in the signal; determining a first threshold and a second threshold, wherein
   the first and second thresholds are each an integer number of samples, and the second threshold is greater than the first threshold;
   forming a first set of consecutive sample locations from the identified subset of sample locations; and
   replacing the missing samples in the first set of consecutive sample locations using a replacement process selected based at least in part on a comparison between a number of locations in the first set of consecutive locations, the first threshold, and the second threshold, and wherein the selected replacement process comprises signal modeling if the number of locations is between the first and second thresholds.

2. The method of claim 1, wherein the samples in the signal correspond to a number of data packets arriving at a location in a network within a time interval.

3. The method of claim 1, wherein the selected replacement process comprises signal interpolation if the number of locations is less than the first threshold.

4. The method of claim 1, wherein signal modeling comprises identifying a trend component of the signal based on a plurality of received samples.

5. The method of claim 1, wherein signal modeling comprises identifying a cyclical component of the signal based on a plurality of received samples.

6. The method of claim 5, further comprising determining a period of the cyclical component of the signal, wherein:
the first threshold is determined to be at least an order of magnitude less than the determined period; and
the second threshold is determined to be on a same order as the determined period.

7. The method of claim 1, further comprising receiving a plurality of quality values, wherein each quality value in the plurality of quality values is an amount of accuracy of a corresponding discrete sample.

8. The method of claim 7, wherein the subset of sample locations representing missing samples in the signal is identified by identifying discrete samples with corresponding quality values below a quality threshold.

9. The method of claim 7, wherein the replacement process is based at least in part on a plurality of quality values corresponding to a plurality of identified non-missing samples.

10. A computer apparatus for replacing missing samples in a signal comprising a plurality of discrete samples, comprising:
a memory containing instructions that, when executed by one or more processors, cause the one or more processors to perform a set of steps comprising:
receiving a plurality of the discrete samples, each discrete sample having a respective sample location in a set of sample locations;
identifying a subset of sample locations representing missing samples in the signal;
determining a first threshold and a second threshold, wherein
the first and second thresholds are each an integer number of samples, and the second threshold is greater than the first threshold;
forming a first set of consecutive sample locations from the identified subset of sample locations; and
replacing the missing samples in the first set of consecutive sample locations using a replacement process selected based at least in part on a comparison between a number of locations in the first set of consecutive locations, the first threshold, and the second threshold, and wherein the selected replacement process comprises signal modeling if the number of locations is between the first and second thresholds.

11. The apparatus of claim 10, wherein the samples in the signal correspond to a number of data packets arriving at a location in a network within a time interval.

12. The apparatus of claim 10, wherein the selected replacement process comprises signal interpolation if the number of locations is less than the first threshold.

13. The apparatus of claim 10, wherein signal modeling comprises identifying a trend component of the signal based on a plurality of received samples.

14. The apparatus of claim 10, wherein signal modeling comprises identifying a cyclical component of the signal based on a plurality of received samples.

15. The apparatus of claim 14, further comprising a processor for determining a period of the cyclical component of the signal, wherein:
the first threshold is determined to be at least an order of magnitude less than the determined period; and
the second threshold is determined to be on a same order as the determined period.

16. The apparatus of claim 10, further comprising a processor for receiving a plurality of quality values, wherein each quality value in the plurality of quality values is an amount of accuracy of a corresponding discrete sample.

17. The apparatus of claim 16, wherein the subset of sample locations representing missing samples in the signal is identified by identifying discrete samples with corresponding quality values below a quality threshold.

18. The apparatus of claim 16, wherein the replacement process is based at least in part on a plurality of quality values corresponding to a plurality of identified non-missing samples.

* * * * *